(12) United States Patent
Jayne et al.

(10) Patent No.: US 6,619,993 B2
(45) Date of Patent: Sep. 16, 2003

(54) DSX JACK CONNECTION SYSTEM

(76) Inventors: Robert Jayne, 1724 E. 61$^{ST}$, Spokane, WA (US) 99223; Alan Petrie, 22809 E. County Vista Dr., #225, Liberty Lake, WA (US) 99019; Tom Rasp, 107 S. Neyland Ave. #1, Liberty Lake, WA (US) 99019; Reese Larson, E. 11923 4$^{TH}$ Ave., Spokane, WA (US) 99206

( * ) Notice: Subject to any disclaimer, the term of this patent is extended or adjusted under 35 U.S.C. 154(b) by 0 days.

(21) Appl. No.: 09/873,113

(22) Filed: Jun. 1, 2001

(65) Prior Publication Data

US 2002/0182939 A1 Dec. 5, 2002

(51) Int. Cl.$^7$ ................................................ H01R 17/00
(52) U.S. Cl. ........................................ 439/660; 439/668
(58) Field of Search ................................ 439/668, 669, 439/79, 947, 108, 188, 339, 405, 875, 395, 660; 361/772–776, 803

(56) References Cited

U.S. PATENT DOCUMENTS

| | | | |
|---|---|---|---|
| 4,737,113 A | 4/1988 | Hopper et al. | |
| 4,820,200 A | 4/1989 | Lau | |
| 4,840,568 A | 6/1989 | Burroughs et al. | |
| 4,975,087 A | 12/1990 | Williams et al. | |
| 5,267,881 A | * 12/1993 | Matuzaki | 439/660 |
| 5,279,508 A | * 1/1994 | Lee | 439/660 |
| 5,295,843 A | * 3/1994 | Davis et al. | 439/108 |
| 5,393,249 A | 2/1995 | Morgenstern et al. | |
| 5,413,494 A | 5/1995 | Dewey et al. | |
| 5,439,395 A | 8/1995 | Laukzemis | |
| 5,634,822 A | 6/1997 | Gunell | |
| 5,879,197 A | 3/1999 | Dewey | |
| 5,938,478 A | 8/1999 | Werner | |
| 6,038,766 A | 3/2000 | Werner | |
| 6,116,961 A | 9/2000 | Henneberger et al. | |

* cited by examiner

Primary Examiner—P. Austin Bradley
Assistant Examiner—Phuongchi Nguyen
(74) Attorney, Agent, or Firm—Wells St. John P.S.

(57) ABSTRACT

A connection system for electrically and mechanically connecting a DSX jack to a jack assembly, the system including a male connector with a plurality of elongated conductors electrically connected to the jack or the jack assembly, a dielectric shroud around the elongated conductors, the shroud having slits adjacent each of the elongated conductors, and a female connector with a female dielectric edge connector with an internal cavity with guides therein, a plurality of tuning fork contacts seated within the guides in the internal cavity and electrically connected to the other of the jack or the jack assembly, the tuning fork contacts including two prongs with a conductor aperture between the two prongs, the conductor aperture corresponding to the elongated conductors of the male connector, and the tuning fork contacts positioned to slidably mate with corresponding ones of the plurality of elongated conductors in the male connector. The male connector slides into the female connector and electrical contact is thereby made between the tuning fork contacts and the corresponding elongated conductors in the male connector.

4 Claims, 19 Drawing Sheets

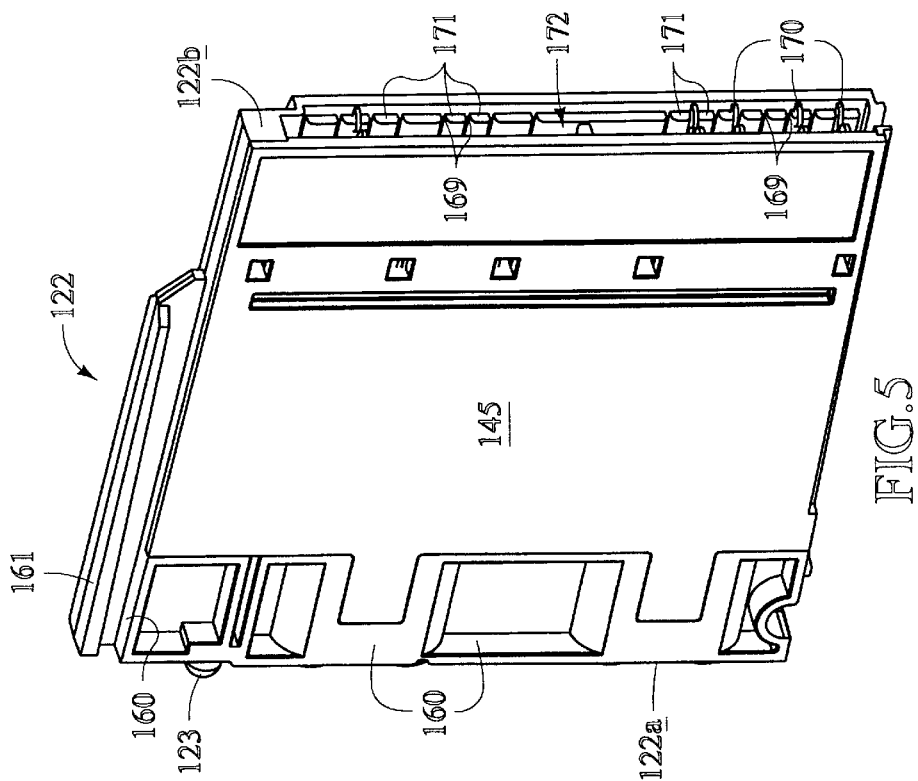
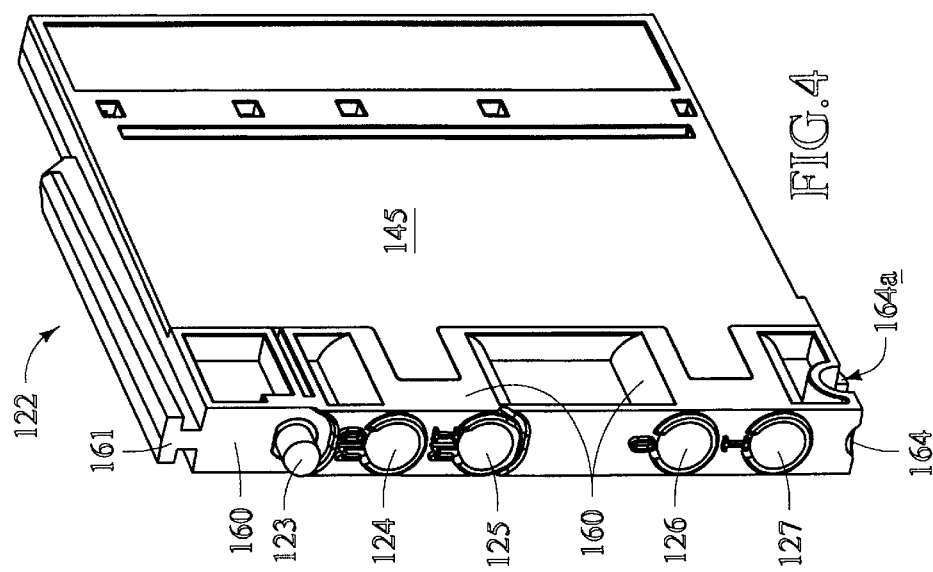
FIG.5
FIG.4

DSX JACK CONNECTION SYSTEM

TECHNICAL FIELD

This invention generally pertains to a jack connection system for connecting DSX jacks to jack assemblies.

BACKGROUND OF THE INVENTION

Jack assemblies have been well known in the telecommunications industry for various applications, including without limitation, for digital signal cross connect (DSX) equipment. Jack assemblies are typically used for the electrical connection between cables in a central office, for cross connecting and for the terminations of lines at various locations. Examples of jack assemblies are disclosed in U.S. Pat. Nos. 4,861,281; 4,975,087; and 5,938,478, all of which are incorporated herein by reference.

It is an object of this invention to provide an improved jack connection system, including an improved way to connect jacks to jack assemblies.

BRIEF DESCRIPTION OF THE DRAWINGS

Preferred embodiments of the invention are described below with reference to the following accompanying drawings.

FIG. 4 is a perspective view of a jack which may be used in the jack assembly illustrated in FIG. 2;

FIG. 5 is a rear perspective view of the jack illustrated in FIG. 4;

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
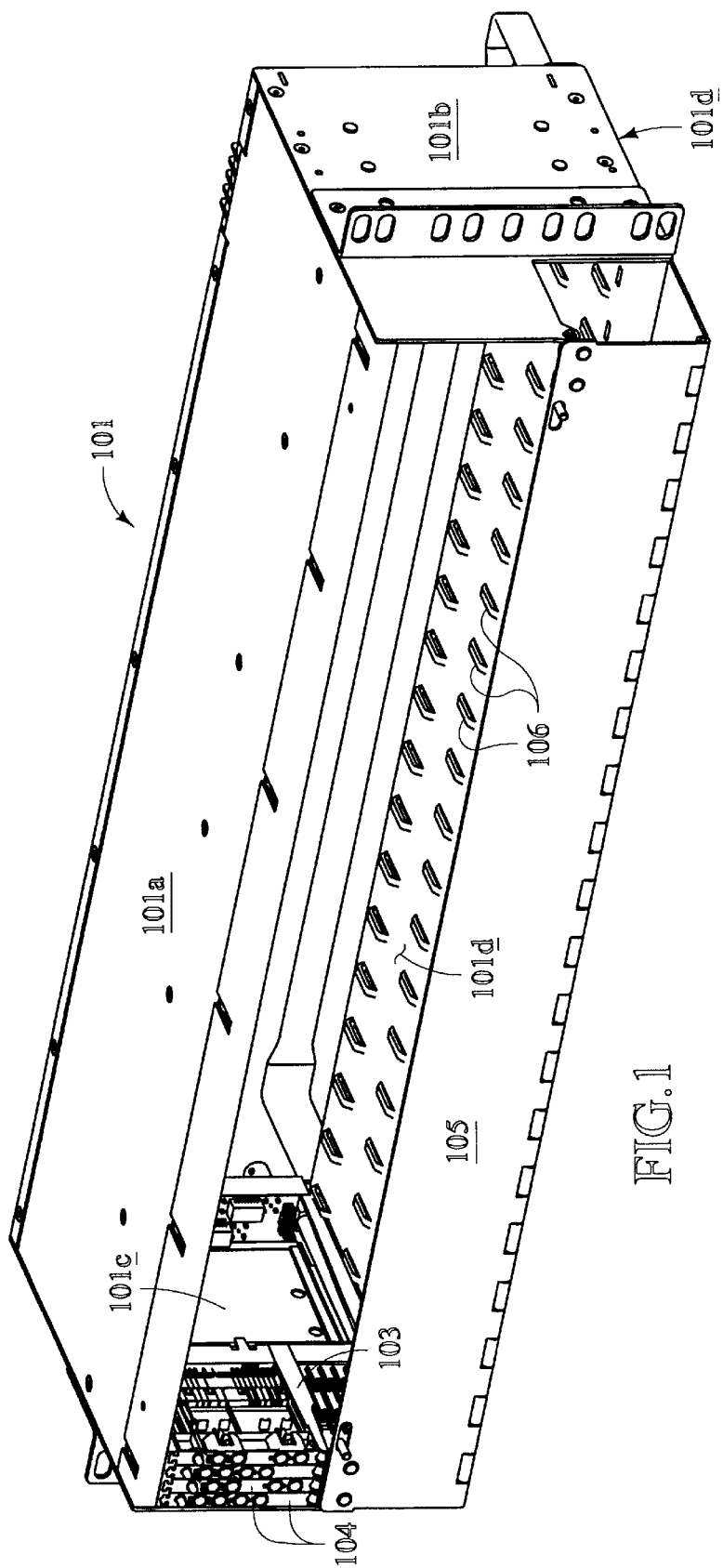
FIG. 1 is a perspective view of a typical jack assembly cabinet or panel.

FIG. 1 is a front perspective view of a cabinet which may be utilized for jack assemblies in a telecommunications facility, and illustrates cabinet framework 101 with top side 101a, first side 101b, second side 101c and bottom 101d. One jack assembly 103 is illustrated installed within cabinet framework 101 with front cover 105 of cabinet 101 pivoted upward in a closed position. A plurality of jacks 104 are shown within jack assembly 103. While four jacks are shown in the jack assembly, there is no particular number of jacks or configuration of jacks in four packs, six packs or other numbers in a jack assembly, as this invention is intended to cover all such configurations and numbers of jacks.

Jack assemblies 103 may be slid into cabinet framework 101 on bottom surface 101d with projections 106 utilized for placement, alignment and possible securement of the jack assemblies 103.

Figure 2:
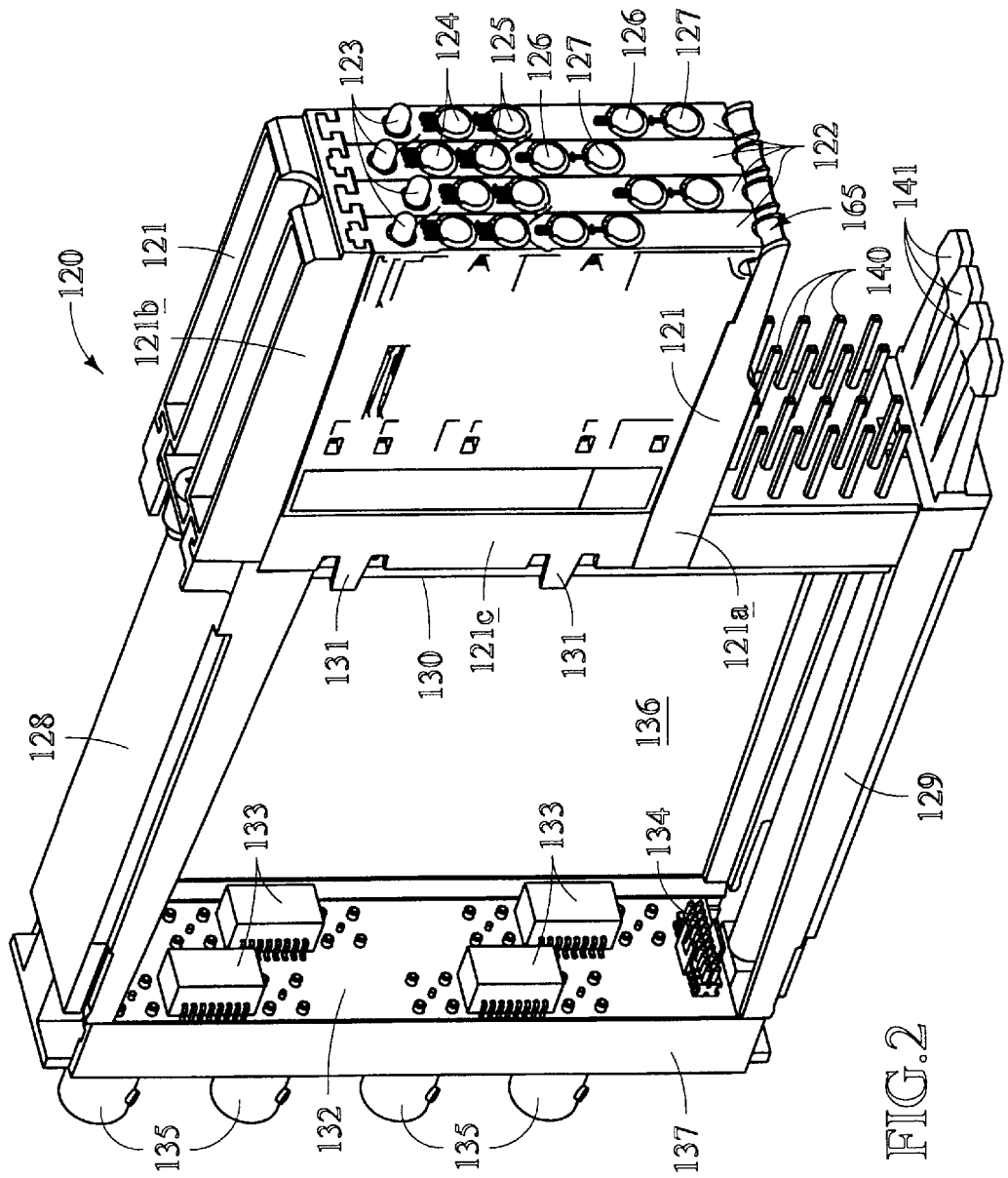
FIG. 2 is a perspective view of a jack assembly system contemplated by one embodiment of this invention.

FIG. 2 illustrates one embodiment of a jack assembly 120 according to this invention. FIG. 2 illustrates jack mount support 121 with lower support 121a, upper support 121b and rear connecting support 121c. A plurality of jacks 122 are shown installed or inserted into jack mount structure 121. Shown on jacks 122 are LEDs 123, output monitor apertures 124, input monitor apertures 125, output apertures 126, and input apertures 127. There are plug apertures in the front of the jacks, which are known. For instance the plug aperture may be set up to receive plugs to monitor the input, to monitor the output, to connect to the input or to connect to the output. The term plug aperture includes the apertures for receiving the plugs whether otherwise referred to as a bore, port, sleeve or otherwise.

FIG. 2 further illustrates jack assembly intermediate structure members, which while not necessary to practice all embodiments of this invention, including upper structure 128 and lower structure 129. Upper structure 128 and lower structure 129 serve as part of the framework to connect the rear assembly to the jack mount structure.

Jack mount structure 121 is attached to circuit board 130 (which is not fully shown) by latches 131, and may be further attached by screws or other fasteners. There are no specific means of connecting the various components of the jack assembly, as numerous alternatives are available and contemplated within the scope of this invention and as are known in the art.

The rear portion of the jack assembly includes circuit board 132 with baluns 133 mounted thereon, connector terminal 134 for receiving a ribbon-type connector to electrically connect the rear circuit board 132 to the front circuit board 131. Any one of a number of different types of pin or other connectors may be utilized to make the connection between first circuit board 130 (also referred to as front circuit board 130) and second circuit board 132 (also referred to as rear circuit board 132).

A plurality of rear connectors 135 project rearwardly from the jack assembly and are mounted on rear circuit board 132. A cosmetic rear cover 137 is also shown in FIG. 2.

It should be noted that the jack assembly may have an intermediate cavity 136 which need not be any particular size, and it may be desired for different applications to reduce or eliminate the intermediate cavity 136 by bringing rear circuit board 132 closer to front circuit board 130, or by combining the two circuit boards.

Front terminal pins 140 are mounted on front circuit board 130 to provide front electrical connection points. In some applications, it is desirable to have a certain configuration or numbering of pins mounted on the rearward side of the rear circuit board 132, and ribbon connectors utilized between front circuit board 130 and rear circuit board 132 may be attached to the connector 134 in a reverse orientation to achieve different configurations on the rear or back plane side of the jack assembly. Fanning strips 141 are also shown in FIG. 2.

Figure 3:
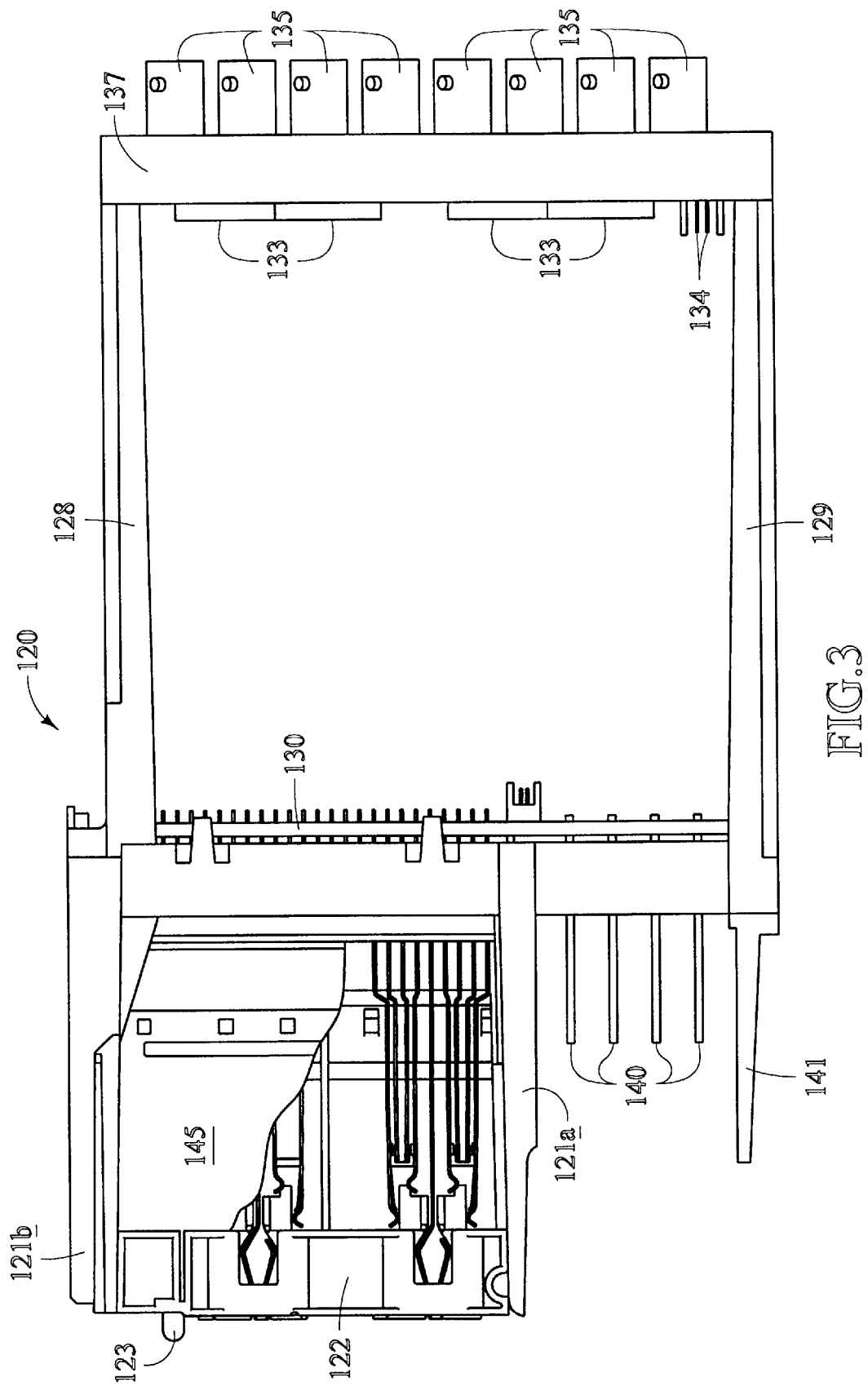
FIG. 3 is a side view of the embodiment of the invention illustrated in FIG. 2.

FIG. 3 is a side elevation view of the embodiment of a jack assembly illustrated in FIG. 2, showing the same components, which are numbered identically and will not therefore be repeated. FIG. 3 further illustrates jack cover 145 to show the internal terminals or contacts within jacks 122.

FIG. 4 is a front perspective view of one embodiment of a jack contemplated by this invention, illustrating jack body 160, jack side cover 145, input aperture 127, output aperture 126, input monitor aperture 125, output monitor aperture 124, and LED 123. Top rail 161 may be utilized to align and guide jack 122 when sliding it into a jack mount structure. The rail 161 may be any one of a number of different possible shapes, as no one in particular is required to practice this invention.

FIG. 4 also shows part of a tool aperture 164 on the lower front portion of the jack 122, as well as a more pronounced or engaging part of the tool aperture detent 164a which, as shown, may be a semi-circle. There is no particular shape or configuration of the tool aperture required to practice this invention, as numerous configurations may be utilized.

It will also be noted by those of ordinary skill in the art that in the preferred embodiment, lower support 121 includes a portion of a tool aperture 165 (as shown in FIG. 2).

Figure 6:
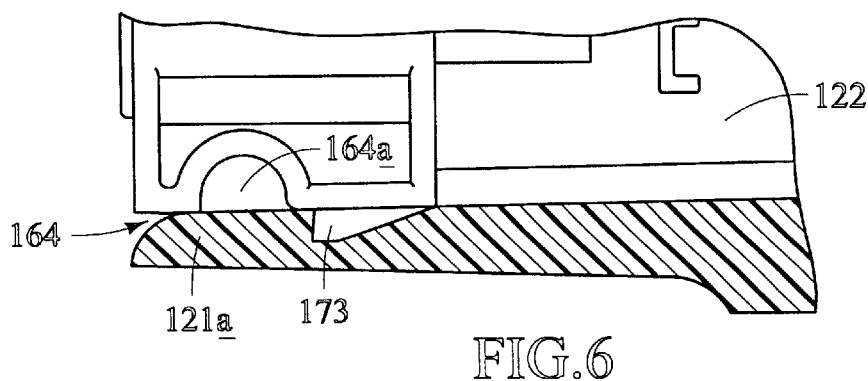
FIG. 6 is a detail elevation view of the interaction of a jack with a jack assembly mount structure, illustrating a jack removal system for easily removing a jack from the jack mount structure.
Figure 7:
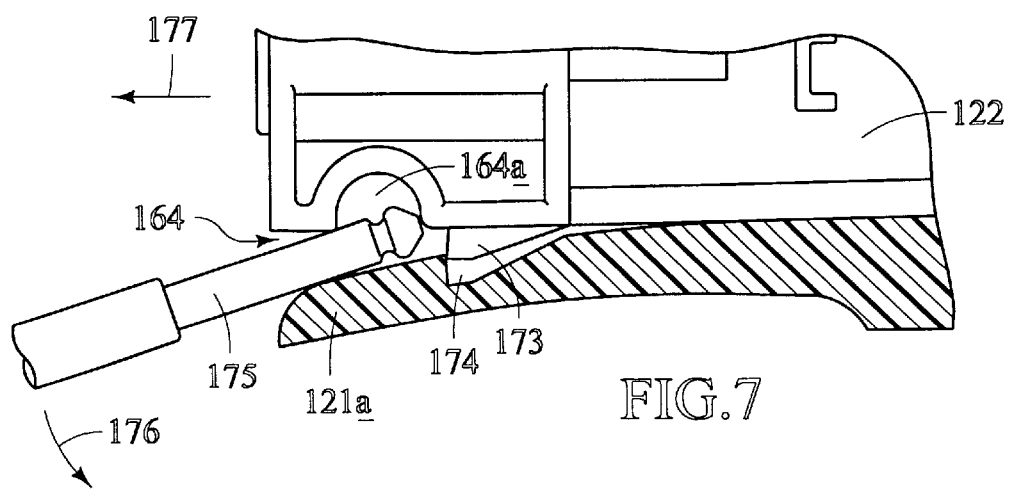
FIG. 7 is the detail shown in FIG. 6, with a jack plug being utilized as a jack removal tool.
Figure 8:
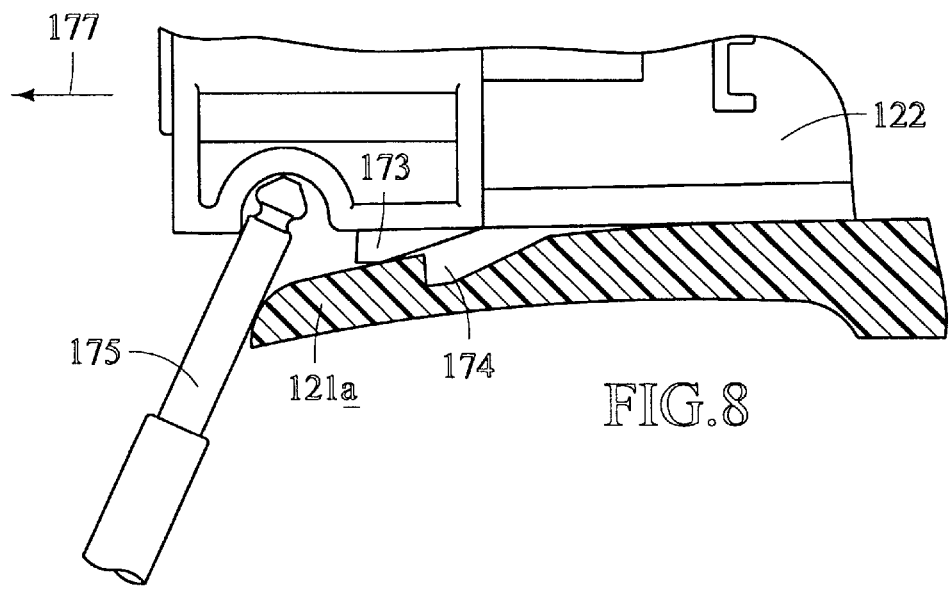
FIG. 8 is the same detail as FIG. 7, showing how the jack removal tool utilizes a lower jack mount support as a fulcrum.

FIGS. 6 through 8 illustrate an embodiment of a jack removal system contemplated by this invention and will be discussed more fully below.

FIG. 5 is a rear perspective view of the embodiment of the jack illustrated in FIG. 4, the same components having the same numbers as FIG. 4 and will therefore not be repeated here. FIG. 5 further illustrates a rear connection system which may be utilized in this invention, and which provides an embedded or shrouded rear connector for jack 122.

For instance, in a preferred embodiment, a plurality of tuning fork-shaped contacts, or split-end contacts, may be provided at the rear side 122b of jack 122, which is spaced apart from front side 122a. The plurality of contacts 170 is retained, embedded and/or shrouded in a dielectric guide housing, which includes projections 171 which create, form and/or define guide slots 169 between projections 171. The tuning fork contacts 170 shown have pin apertures therein (as shown more fully in FIG. 15) and are configured to receive corresponding terminal pins or contacts (more fully shown in FIG. 20).

The terminal pins may also protected by a dielectric member, housing or shroud, to provide protection for the terminal pins and a consistent, foolproof connection between the jack and any support, edge connector or circuit board with which it would be slidably mounted and electrically connected.

FIG. 5 shows a plurality of tuning-fork or tuning fork contacts 170, located within guides 169. The projections and guides are dielectric and are utilized for the placement and guiding of terminal pins for mating with tuning fork terminals when the terminal pins are slid into rear connector aperture 172.

It will also be noted by those of ordinary skill in the art that although the tuning fork contacts 170 are shown on the jack 122, one could also use the male terminal pin or contact portion on the rear 122b of the jack 122 and utilize the tuning fork contacts 170 on an edge connector, circuit board or jack mount structure.

FIGS. 6 through 9 are detail views showing an embodiment of the jack removal system contemplated by this invention. FIG. 6 illustrates jack 122 with tool aperture 164 being partially included within jack 122 and partially included within lower support 121a of jack mount structure 121. Tool aperture 164 includes detent 164a which provides a location into which a tool may be forced and thereafter utilized to push against the jack 122 to remove it from the jack mount structure 121a.

FIG. 6 further illustrates jack stop 173 which may be integral with jack 122 and matingly fits within a slot 174 (shown in FIG. 7) within lower support 121a. When the jack 122 is slid within the jack mount structure, the lower support 121a flexes slightly to accommodate jack stop 173 and when the jack 122 is in its desired location, it will matingly fit within slot 174 (shown in FIG. 7). Once jack stop 173 is within slot 174, the jack is retained in its desired location.

FIG. 7 shows removal tool 175, which is shown as a bantam jack plug, inserted into tool aperture 164, thereby forcing lower support 121a to flex downward. As removal tool 175 is further pushed within tool aperture detent 164a, lower support 121a is utilized as a fulcrum and removal tool 175 may then be rotated in the direction of arrow 176, thereby pushing or forcing jack 122 out of jack mount structure in the direction of arrow 177. The movement of removal tool 175 in the direction of arrow 176 causes lower support 121a to flex downward a sufficient distance such that jack stop 173 has clearance out of slot 174 and then able to be moved in the direction of arrow 177. Jack 122 is thereafter easily removed from the jack mount structure.

There is no particular type of removal tool 175 required, as a screwdriver or any other type of prod or device which may be used as a lever may be utilized as contemplated by this invention. Furthermore, the tool aperture may be wholly within jack 122 or lower support 121a so long as there is some portion of jack 122 which removal tool 175 may push back against as it is utilizing lower support 121a as a fulcrum. Furthermore, the tool aperture may be located at the lower support 121a or the upper support 121b, all within the contemplation of this invention.

FIG. 8 shows jack 122 as partially removed from the jack mount structure and wherein jack stop 173 has been removed from slot 174 while lower support 121a is flexed downward due to the force of removal tool 175 and its rotation against lower support 121a as a fulcrum. Jack 122 is thereby moved in the direction of arrow 177, and as this movement occurs, the electrical contact between jack 122 and the front circuit board 130 (illustrated in FIG. 2) is disconnected.

Figure 9:
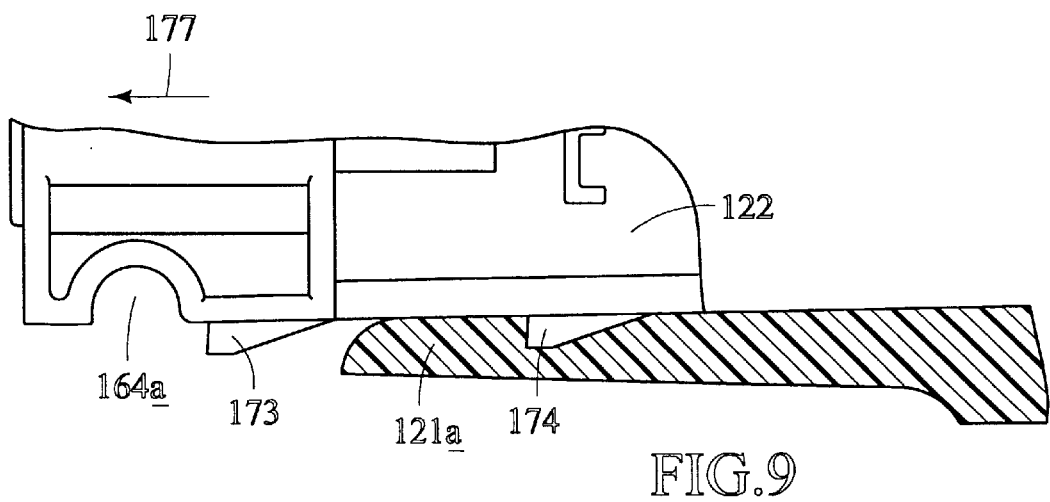
FIG. 9 is the same detail as in FIGS. 6 through 8, and shows the jack after it has been partially removed.

FIG. 9 illustrates jack 122 after it has been sufficiently slid in the direction of arrow 177 such that the removal tool 175 (shown in FIG. 8) is no longer needed to continue to remove the jack from the jack mount structure. All other like numbered components shown in FIG. 9 are the same as in FIG. 8 and will therefore not be repeated here.

Figure 10:
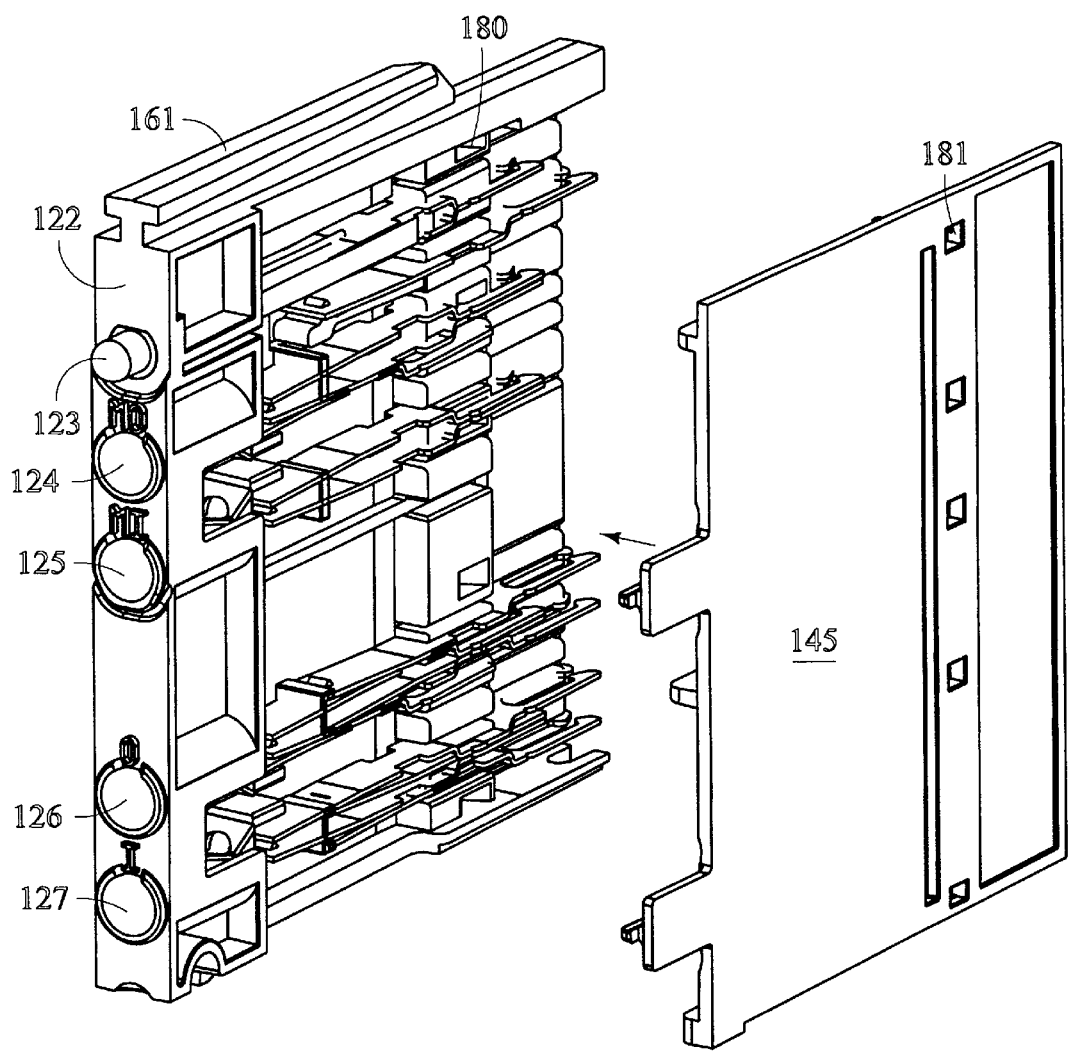
FIG. 10 is a front perspective exploded view of one embodiment of a jack and jack side cover which may be utilized in this invention.

FIG. 10 is a front perspective exploded view of one embodiment of a jack contemplated by this invention. Jack cover 145 may be removably mounted to jack 122 via flexible members 181, which protrude through aperture 180 in jack 122 and latching cover 145 to jack 122.

FIG. 10 further illustrates input aperture 127, output aperture 126, input monitor aperture 125, output monitor aperture 124, and LED 123 on jack 122. Top rail 161 is further shown and has been further described with reference to prior figures.

Figure 11:
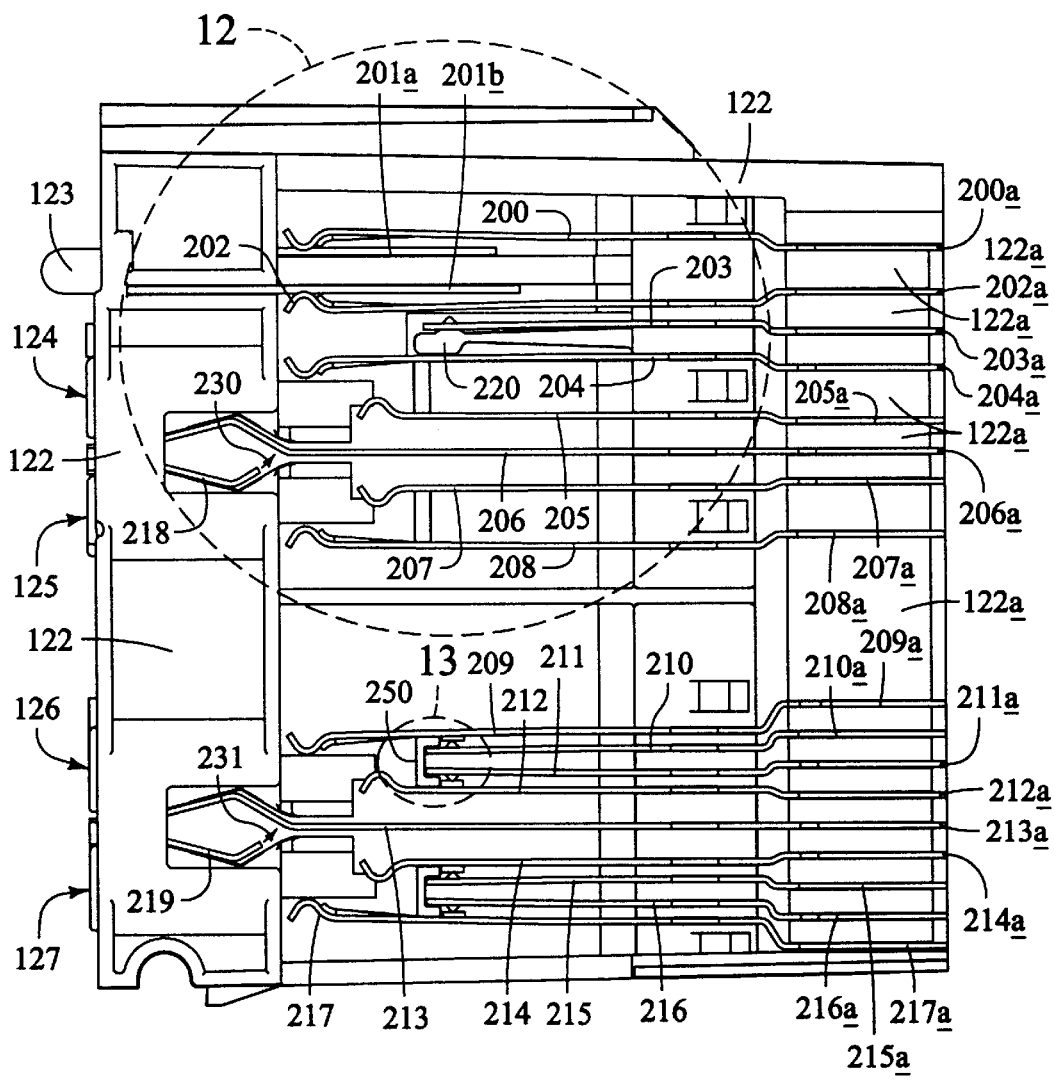
FIG. 11 is a side view of the jack illustrated in FIG. 10, with the side cover removed.

FIG. 11 is a side view of the internal operative components of the jack 122 illustrated in FIG. 10, and better shows the various terminals or contacts within jack body 122.

FIG. 11 illustrates a configuration of terminals and contacts contemplated by one embodiment of this invention, as located within jack 122. The jack body would typically be composed of a dielectric or relatively non-conductive material. FIG. 11 shows LED leads with first LED lead 201a and second LED lead 201b. First LED terminal 200 is shown with a connection end 200a at the rear of jack 122 embedded or shrouded within a rear shrouding or connector portion of the jack body 122a. LED contact terminal 202 which includes connection end 202a is in electrical contact with second LED lead 201b.

When a tip and ring plug is inserted into output monitor aperture 124, the plug contacts output monitor ring terminal 204 and deflects it upward, thereby causing LED contact prod 220 to move upward, and thereby move or force LED switching terminal 203 into LED contact terminal 202. This causes LED 123 to have a complete circuit and causes the LED light to illuminate. Output monitor tip terminal 205 has connection end 205a which makes electrical contact with the tip of a plug placed within output monitor aperture 124. LED contact prod 220 is a resilient or flexible member which may be molded into the jack body of the jack 122.

When a plug is inserted in output monitor aperture 124, it further makes electrical contact with first ground terminal 206 to provide grounding.

Figure 14:
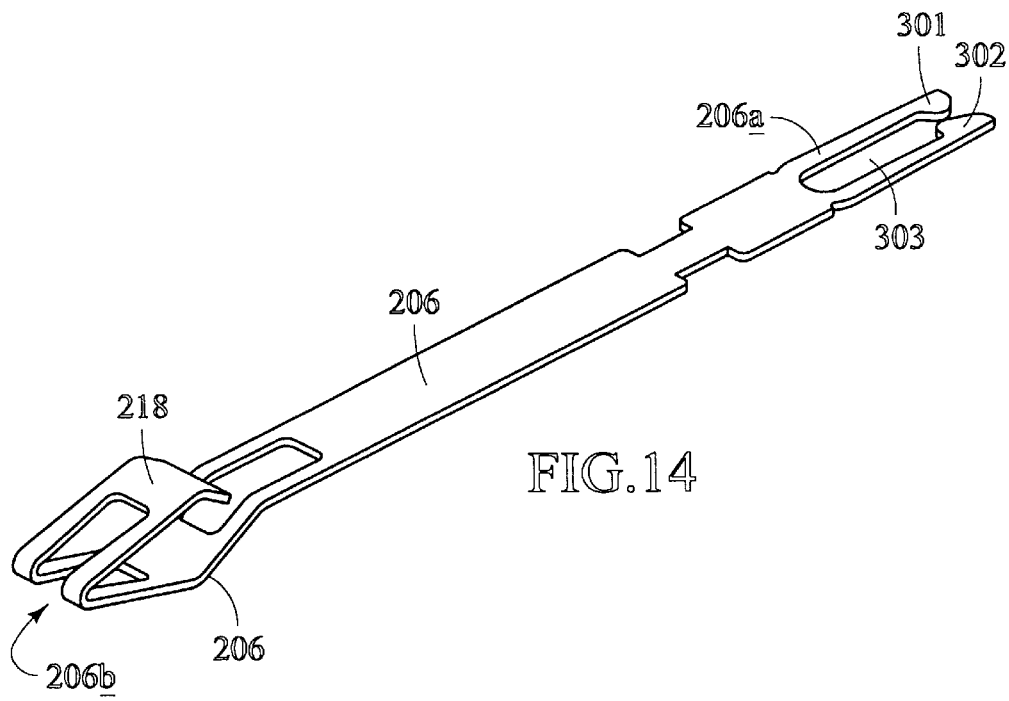
FIG. 14 is a perspective view of an embodiment of a ground terminal which may be utilized in an embodiment of a jack as part of this invention.

It will be noted by those of ordinary skill in the art that most grounding systems within jacks are bus type systems which cover part of the side of the jack and require additional assembly steps. This new grounding system utilizes ground terminals instead of a bus bar type of ground, and utilizes one grounding terminal for two plug apertures. When a bantam plug is inserted in input monitor aperture 125 for instance, it contacts second ground contact 218, which as more fully shown and described relative to FIG. 14, is preferably part of ground terminal 206 (although it could be a separate piece which is moved into electrical contact with ground terminal 206 when a plug is inserted in the plug aperture). First ground terminal 206 therefore provides grounding for two plug apertures.

Input monitor tip terminal 207 has connection end 207a and makes electrical contact with the tip of a plug inserted within input monitor aperture 125. Input monitor ring terminal 208 has connection end 208a and makes electrical contact with the ring of a plug inserted in input monitor aperture 125. These above-referenced terminals and contacts are all secured in slots which are preferably molded in jack body 122 for the placement or location and holding of the terminals.

When a plug is placed in output aperture 126 it makes electrical contact with first ring terminal 209 which has connection end 209a and moves it away from or out of electrical contact with second ring terminal normal ring contact 210 (which includes connection end 210a). Also when a plug is inserted in output aperture 126, it makes electrical contact with first tip terminal 212 which includes connection end 212a and moves it away from normal tip contact 211 (which includes connection end 211a).

When a plug is inserted into output aperture 126, it also makes electrical contact with third grounding terminal 213 (which includes connection end 213a).

When the plug is inserted into input aperture 127, it makes electrical contact with input first ring terminal 214 (which includes connection end 214a) and moves input first ring terminal 214 away from or out of electrical contact with normal tip contact 215 (which includes connection end 215a). Also when a plug is inserted into input aperture 127 it makes electrical contact with first input ring terminal 217 (which includes connection end 217a), thereby moving first input ring terminal 217 away from or out of electrical contact with normal ring contact 216 for the input (which includes connection end 216a).

It will also be noted for grounding purposes that a plug inserted in input aperture 127 makes electrical contact with fourth ground terminal 219, which may be a separate terminal which is pushed into third ground terminal 213, thereby providing effective grounding for plugs inserted within input aperture 127. Fourth ground terminal 219 may also be a one piece ground terminal with third ground terminal 213, as shown and described with respect to FIG. 14.

Contact stop 250 is an example of a retention means to hold normal ring contact 210 and normal tip contact 211 such that when terminals 209 and 212 are moved away from normal ring contact 210 and normal tip contact 211, the two contacts do not move away with them but instead electrical contact is broken and guide structure 250 prevents the normal ring contact 210 and normal tip contact 211 from moving. This is more fully shown and described with respect to FIG. 13 below. While contact stop 250 is preferably molded into the body of jack 122, which makes it fixed, it may also be separate from the jack body and have some relative movement with respect to the jack body. Contact stop 250 may be made of any one of numerous types of material, such as a dielectric or of a conductive or metallic material.

FIG. 11 shows the relative configuration of the components to illustrate how the insertion of tip and ring plugs into plug apertures, makes and breaks electrical connections. For example, before a plug is inserted in input aperture 127, spring contact 214 (input first ring terminal 214) is in electrical contact with normal tip contact 215, and spring contact 217 (first input ring terminal 217) is in electrical contact with electrical contact with normal ring contact 216 for the input. When a plug is inserted in input aperture 127, the plug establishes ground contact with ground terminal 219, and deflect spring contact 214 upward out of electrical contact with normal tip contact 215, and also deflect spring contact 217 downward and out of electrical contact with normal ring contact 216 for the input. Electrical circuits are well known to the art and no one in particular is required to practice this invention.

Figure 12:
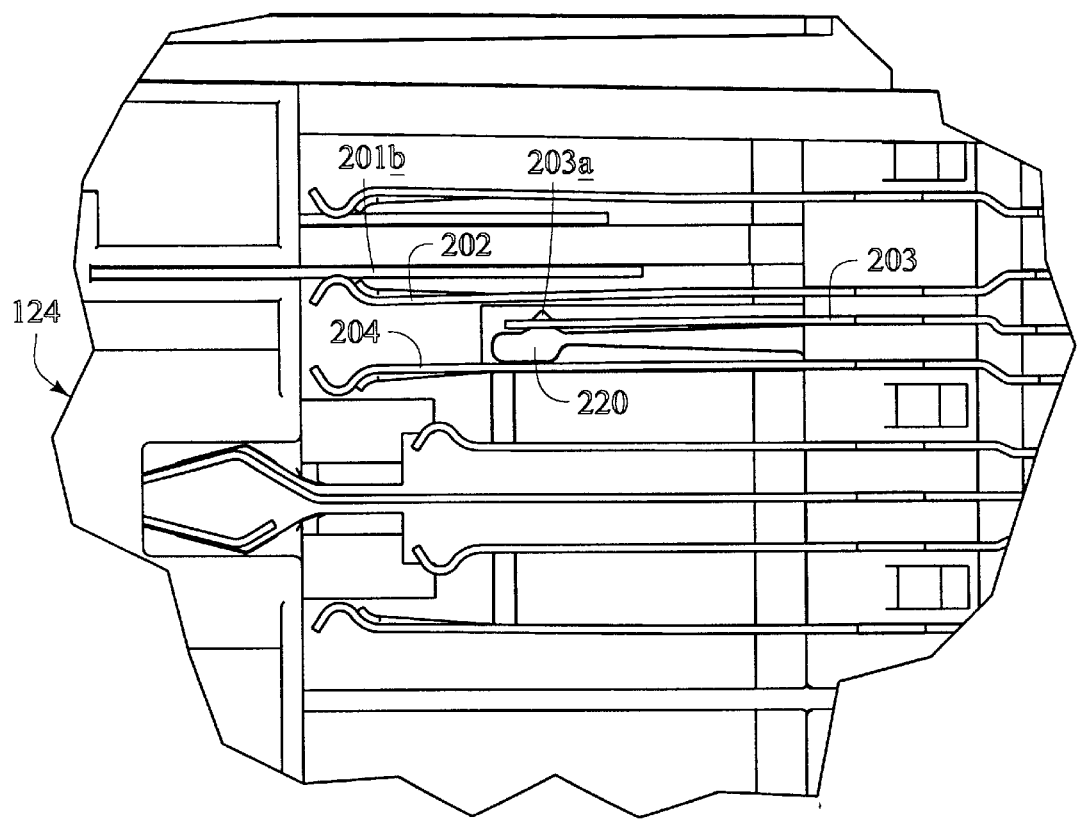
FIG. 12 is a detail of the jack illustrated in FIG. 11, illustrating some of the contacts, including the tip and ring contacts.

FIG. 12 is a partial view from FIG. 11 and better illustrates the electrical contacts made when a plug is inserted into output monitor aperture 124. FIG. 12 shows how LED prod 220 is positioned to flex when pushed upwardly by the force of a plug contacting output monitor ring terminal 204. This causes LED prod 220 to flex upwardly and thereby force LED switching terminal 203 with terminal point 203a into LED contact terminal 202, thereby making electrical contact or electrical connection.

Figure 13:
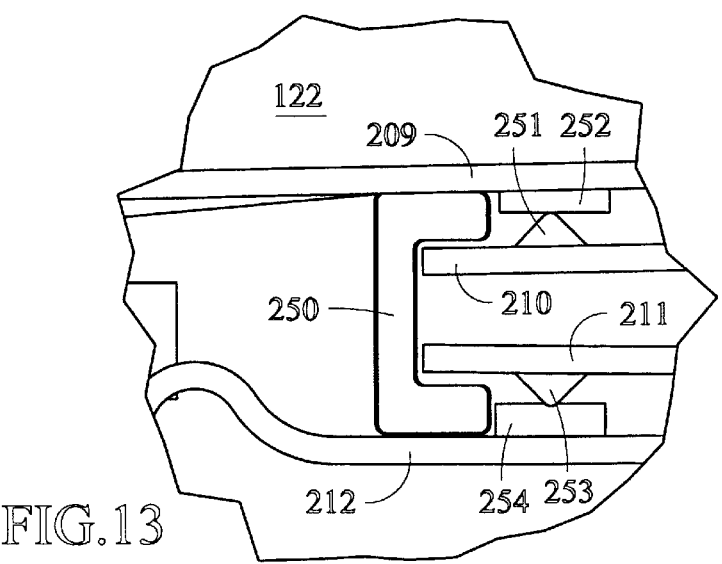
FIG. 13 is a detail from FIG. 12, further illustrating contacts within the jack.

FIG. 13 is a detail view of guide structure 250 and how guide structure 250 may be utilized to control contact movement, which also may allow wiping as described below. Guide structure 250 is preferably molded into and part of the body of jack 122, and would be made of a dielectric material. Over-bending contact tip and ring terminals around the "C" shaped guide structure allows for contact pressure and more relaxed tolerances in the manufacture and location of the terminals or contacts, as well as the plug apertures, to consistently achieve the same electrical contact when inserting and removing plugs from the corresponding apertures. The configuration shown further provides for the wiping action between contacts, which is known in the art. Forcing the contact of terminal point 251 against and into pad 252 provides slight slipping or relative movement between terminal point 251 and pad 252, which is sometimes referred to as a wiping action or wiping. This wiping or slight relative movement between the terminal point 251 and any terminal which it contacts keeps the contacts clean and free of contaminants, and is known in the art.

FIG. 13 shows first output ring terminal 209, which includes contact pad 252, which starts in electrical contact with normal ring contact 210 for the output plug aperture, which includes terminal point 251. When a plug is inserted in output aperture 126 (not shown in FIG. 13), first output ring terminal 209 is forced or deflected upward and contact pad 252 is thereby moved away from terminal point 251, thereby breaking the electrical contact between the two. Guide structure 250, which is also interacting with other components, keeps normal ring contact 210 from moving very far with first output ring terminal 209. Allowing normal ring contact 210 to move a limited distance with first output ring terminal 209 achieves a desired wiping action.

FIG. 13 similarly shows that when a plug is inserted in output aperture 126, first output tip terminal 212 is deflected downward and terminal pad 254 is thereby moved away from terminal point 253 of normal tip contact 211. Guide structure 250 again acts to keep normal tip contact 211 from moving far with first output tip terminal 212, and preferably maintains the wiping action between terminal pad 254 and terminal point 253. This is maintained by allowing it to move a limited distance before restraining further movement.

FIG. 14 is a perspective view of one embodiment of a ground terminal that may be utilized as part of this invention, illustrating ground terminal 206. At a first end 206a of the ground terminal includes a tuning fork or a tuning fork shaped end, with first contact 301, second contact 302 and contact aperture 303. At a second end 206b of ground terminal 206, the ground terminal is placed generally in a "V" or "U" configuration to provide two contact points for plugs inserted in different apertures to make electrical contact with the ground terminal 206.

FIG. 14 illustrates second ground terminal contact 218 as a one piece terminal with first ground terminal contact 206 such that grounding is made without the need to deflect second ground terminal contact 218 into terminal 206. However, if second ground terminal contact 218 is a separate piece, deflection of it may be utilized to make electrical contact with the first ground terminal contact. This grounding system eliminates the need for typical grounding bars or bus bars to connect to the various locations where grounding is necessary and further provides one grounding terminal for two adjacent plug apertures.

Ground terminal 206 may also have a terminal pin connection at its first end 206a, which would then be connected to a tuning fork connector on a circuit board or other known source of ground.

Figure 15:
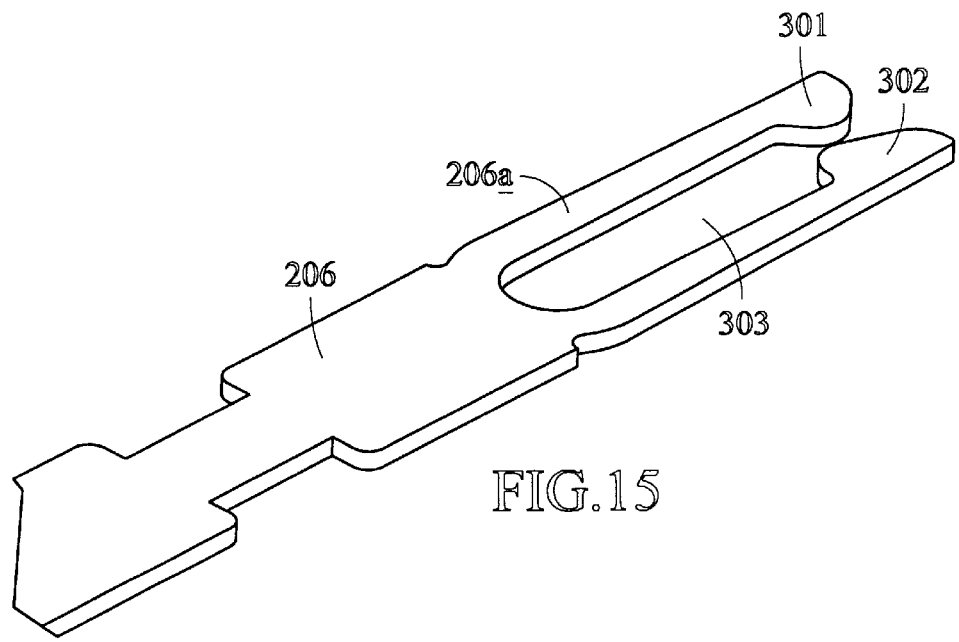
FIG. 15 is a detail view of one end of a tuning fork or split end of a terminal which may be utilized in an embodiment of this invention.

While FIG. 15 is a closer view of first end 206a of ground terminal 206, it also illustrates the split end or tuning fork end that may be used for any or all of the terminals, contacts or springs in a jack, as contemplated by this invention. The contact aperture 303 provides a location into which pin terminals or other pin or similarly shaped contacts may be slid or inserted to make electrical contact with ground terminal 206. It is preferable that a shroud or dielectric member retain the first end 206a of ground terminal 206 and that a terminal pin be correspondingly embedded into a male shroud such that the shroud positions terminal pins for electrical contact with contacts 301 and 302 as the male shroud is slid into the female shroud. The male shroud including terminal pins or conductors would then be slid into contact aperture 303 for a consistent and reliable connection between the proper and corresponding pin terminals and tuning fork terminals or first ends 206a of ground terminal 206.

Figure 16:
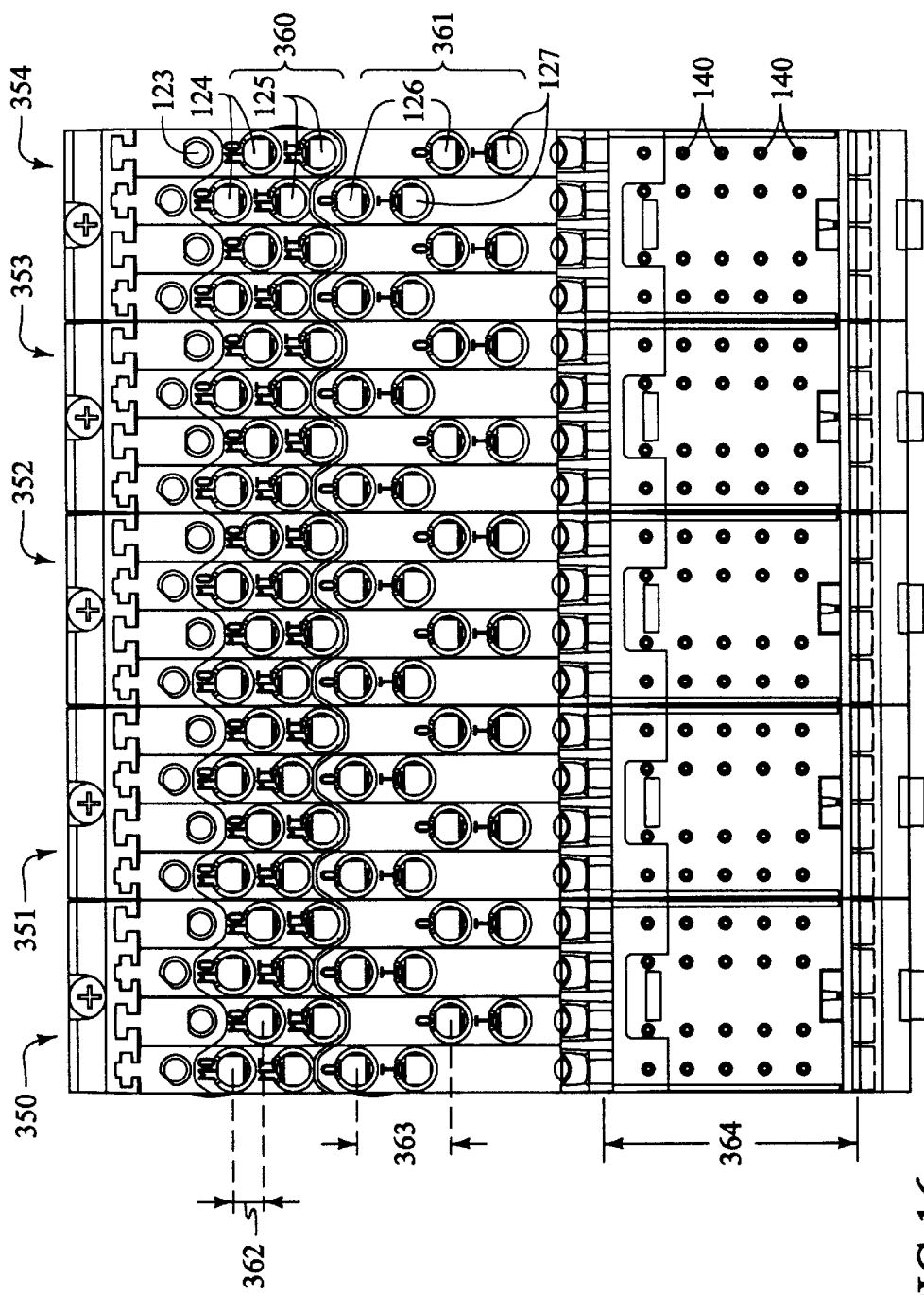
FIG. 16 is a front elevation view of several jack assemblies which may be utilized as part of this invention.

FIG. 16 is a front elevation view of five exemplary jack assemblies 350, 351, 352, 353 and 354, each with four jacks mounted therein. FIG. 16 illustrates a monitor aperture field 360 wherein each jack includes an output monitor aperture 124 and an input monitor aperture 125. For horizontal spacing requirements in using industry standard size bantam plugs, the output monitor apertures 124 on one jack are staggered vertically with respect to the output monitor aperture 124 on a second and adjacent jack. Similar staggering is utilized for the input monitor apertures 125, the output apertures 126 and the input apertures 127. A monitor jack aperture field 360 is therefore shown, as is an input/output aperture field 361.

A benefit to separating the input monitor apertures 124 and the output monitor apertures 125 from the input aperture 127 and the output aperture 126, so that they are adjacent to one another vertically and in the same monitor field, is that the spacing requirements for staggering between monitor apertures on adjacent jacks is different than that between an input and an output jack. Typically when a plug is placed in an input and an output aperture 126, a dual plug is used and thereby two connected plugs are simultaneously inserted into the output aperture 126 and the input aperture 127. There are industry standard-sized plugs with a standard distance between the center lines of each plug, as illustrated as arrow 363, for the input and output apertures. For a U.S. industry standard dual bantam jack plug, the centerline to centerline distance of the plugs is approximately 0.312 inches.

By placing both the input monitor aperture and the output monitor aperture in the same field, or adjacent one another the staggering of the input monitor aperture and the output monitor aperture on adjacent jacks may be lessened, which may reduce the overall height requirements of the jack. By placing the input monitor aperture and the output monitor aperture in the same field and above the input/output aperture field, the user does not have to contend with patch cords and other items which may obscure or hinder access to the monitor aperture(s). Typically, the input monitor aperture 125 is accessed by a single plug and not a dual plug, and the same is true for accessing an output monitor aperture 124. The monitor aperture stagger distance, i.e. the distance between output monitor apertures on adjacent jacks is shown as arrow 362 (which is also referred to herein as the second staggered distance), and is preferably less than the distance between the output aperture stagger distance and/or the input aperture stagger distance (which is also referred to herein as the first staggered distance) which is reflected by arrow 363.

FIG. 16 identifies one of each of the staggered apertures 124. Input monitor apertures 125, output apertures 126 and input apertures 127 are also shown, as are terminal pins 140 and LED 123. FIG. 16 shows the plug apertures segregated into two aperture or port fields, the first for monitor apertures or ports and the second for the input/output apertures or ports.

In an industry where more and more wires and cables are necessary for increasing demands on telecommunications equipment and systems, cable management becomes much more important. Reducing the vertical height of jacks by reconfiguring the fields will have the benefit of decreased height of the overall structure and/or more room for cable management. For example more space could then be provided in the area of the terminal field where the terminal pins 140 are located. There are typically numerous wires attached to the terminal pins and management of the wires can be difficult, and therefore maximizing the terminal field height 364 is desirable and beneficial. This invention, by reconfiguring the input monitor apertures and the output monitor apertures into a field and separating them from the output aperture and the input aperture allows for a reduced height in the jack and increased cable management in the jack field 364.

Figure 17:
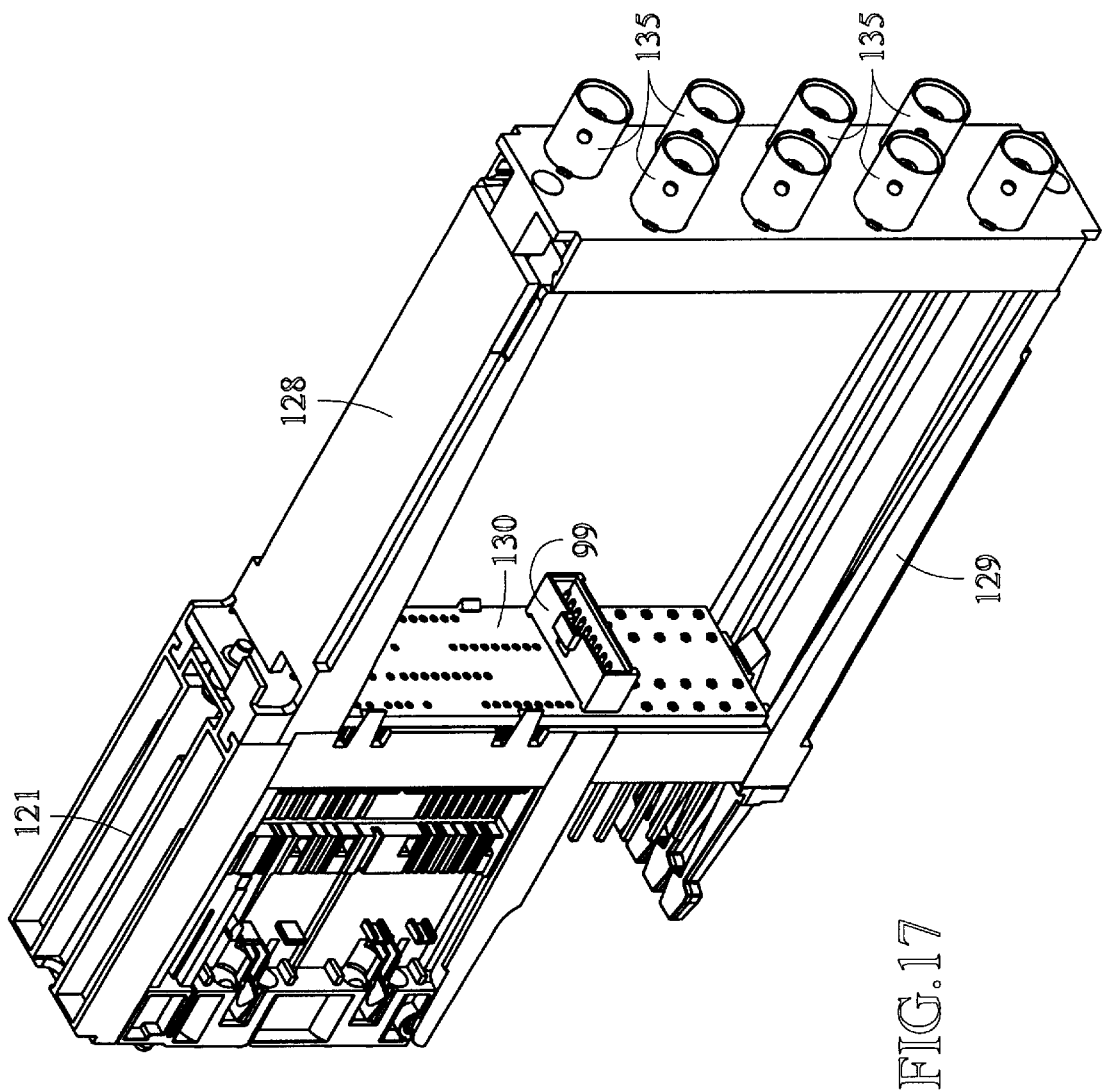
FIG. 17 is a rear perspective view of the jack assembly illustrated in FIG. 2.

FIG. 17 is a rear perspective view of the embodiment of the jack assembly also illustrated in FIG. 2. Components and items are numbered in FIG. 17 the same as in FIG. 2 and will not be re-identified here. FIG. 17 provides a better view of circuit board 130 with connector 99, to which a ribbon connector may be attached at a first end, with the second end of the ribbon or other connector being attached to connector 134 on the rear circuit board 132 (shown in other Figures).

Figure 18:
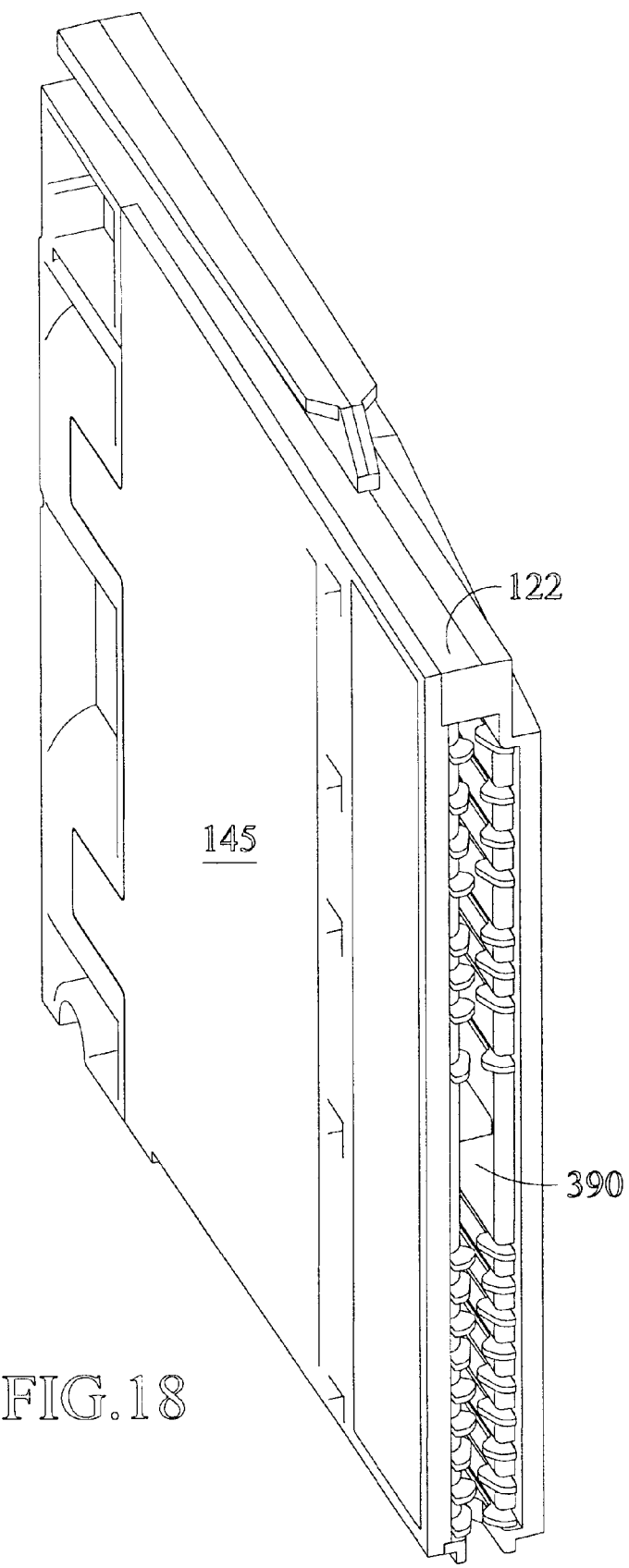
FIG. 18 is a rear perspective view of an embodiment of a jack which may be utilized in this invention, showing the configuration of the terminal ends at the rear of the jack.

FIG. 18 is a rear perspective view of the embodiment of a jack illustrated in FIG. 5 and gives a better view of the rear connector configuration. Side cover 145 combines with jack body 122 to provide a shroud and an edge-type connector configuration at the rear end or second end of jack 122. As can be seen from FIG. 18, a plurality of connection ends of terminals are contained within the edge connector aperture 390, which is generally configured to receive a male connector which includes terminal pins or other conductors configured to electrically and matingly contact with the tuning forks or female-shaped ends of terminals contained within edge connector aperture 390.

Figure 19:
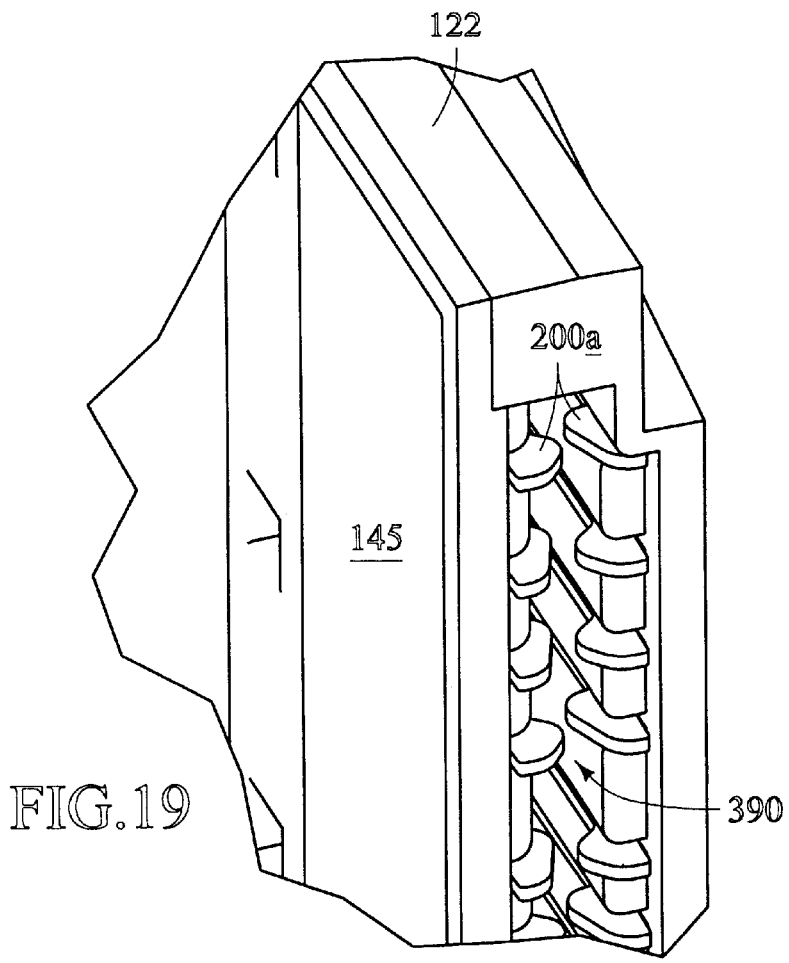
FIG. 19 is a detail view from FIG. 18.

FIG. 19 shows a more detailed view of the edge connector aperture 390 with a plurality of female connection ends 200a of terminals within the jack 122. The female or edge connector side of this type of connection at the rear of a jack may also be made with the female connections being made on the jack mount structure or on a circuit board instead of on the rear end of the jack 122, i.e. the male and female connection ends may be reversed.

It is typically easier to mount contact or terminal pins to a circuit board and then place them in a male shroud than it is to provide a solder cup on the circuit board, and less expensive as well. This connection configuration provides a cost reduction for the jack assembly.

If the corresponding terminals from the jack illustrated in FIG. 11 were the same as those in FIG. 19, for exemplary purposes, connection end 200a of first lead terminal 200 would be as shown as a female edge connection. The same would be true for other items shown in FIG. 11.

Figure 20:
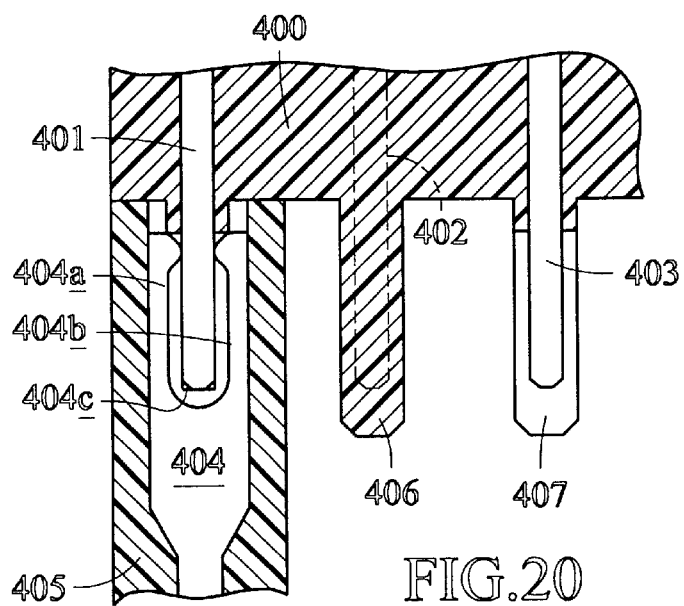
FIG. 20 is a top section view showing jack mount structure with one jack attached, utilizing a rear connection embodiment of this invention.

FIG. 20 is a top section view showing jack mount structure with one jack attached, utilizing a rear connection embodiment of this invention. FIG. 20 illustrates an exemplary jack mount structure 400 with terminal pins 401, 402 and 403. Terminal pin 401 is shown on a different vertical level than terminal pin 402. Terminal pin 401 is matingly inserted into the connection end, which is a tuning fork, of a contact or terminal 404 of a jack. The terminal has first side 404a and second side 404b, with contact aperture 404c between the two.

FIG. 20 further shows how terminal pin 406 is staggered relative to terminal pins 401 and 407 (which are on the same approximate horizontal plane). Dielectric shrouds 405, 406 and 407 are likewise staggered to provide corresponding slots so that terminal pins may matingly fit or slide within contact apertures in the tuning fork of corresponding contacts.

Figure 21:
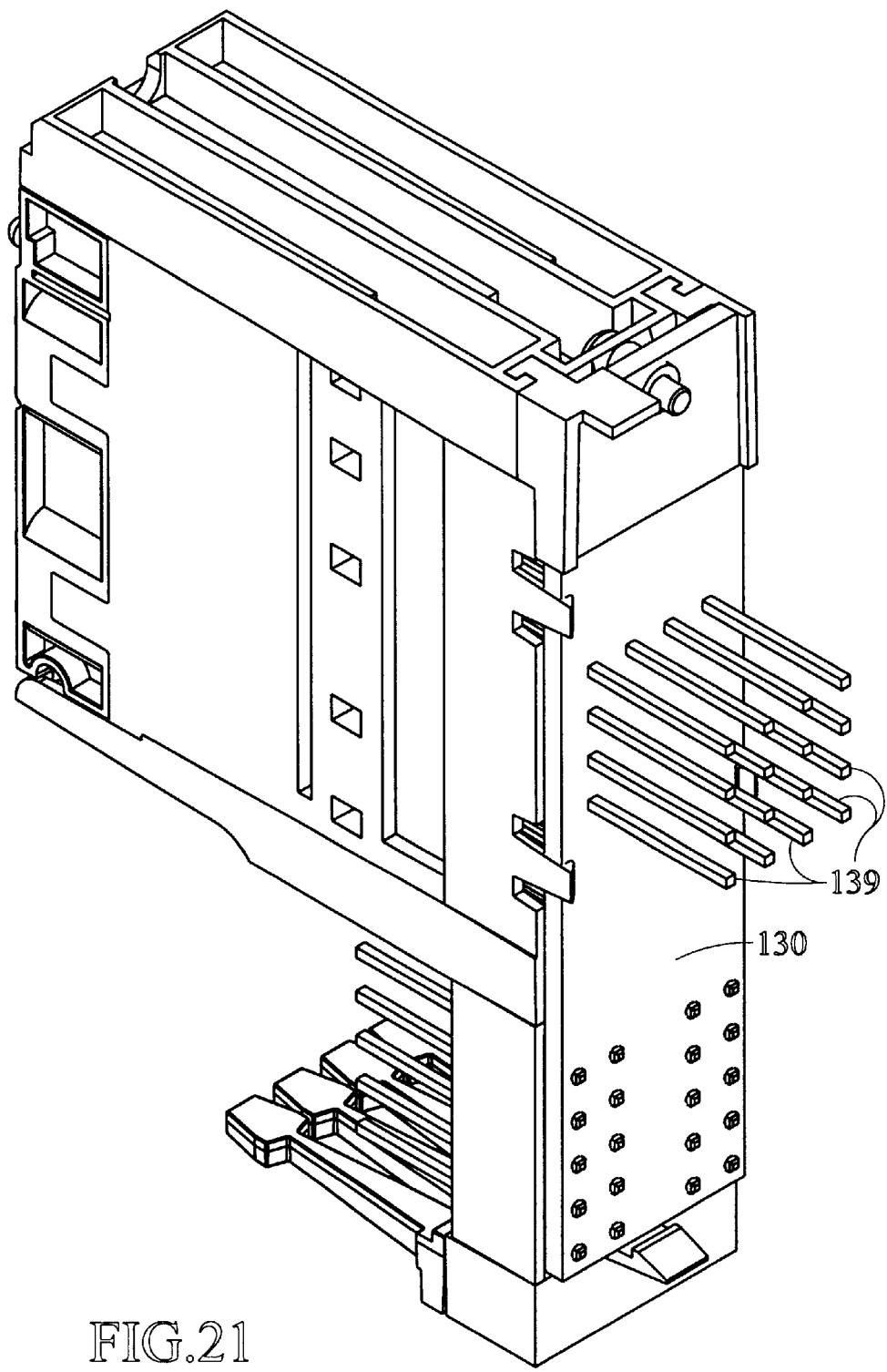
FIG. 21 is a rear perspective view of another embodiment of this invention with terminal pins mounted on a circuit board.

FIG. 21 is a rear perspective view of another embodiment of this invention with a single circuit board 130 with terminal pins 139 mounted thereon. The other components shown are the same as described above with respect to other figures and will not therefore be separately numbered and discussed here.

Figure 22:
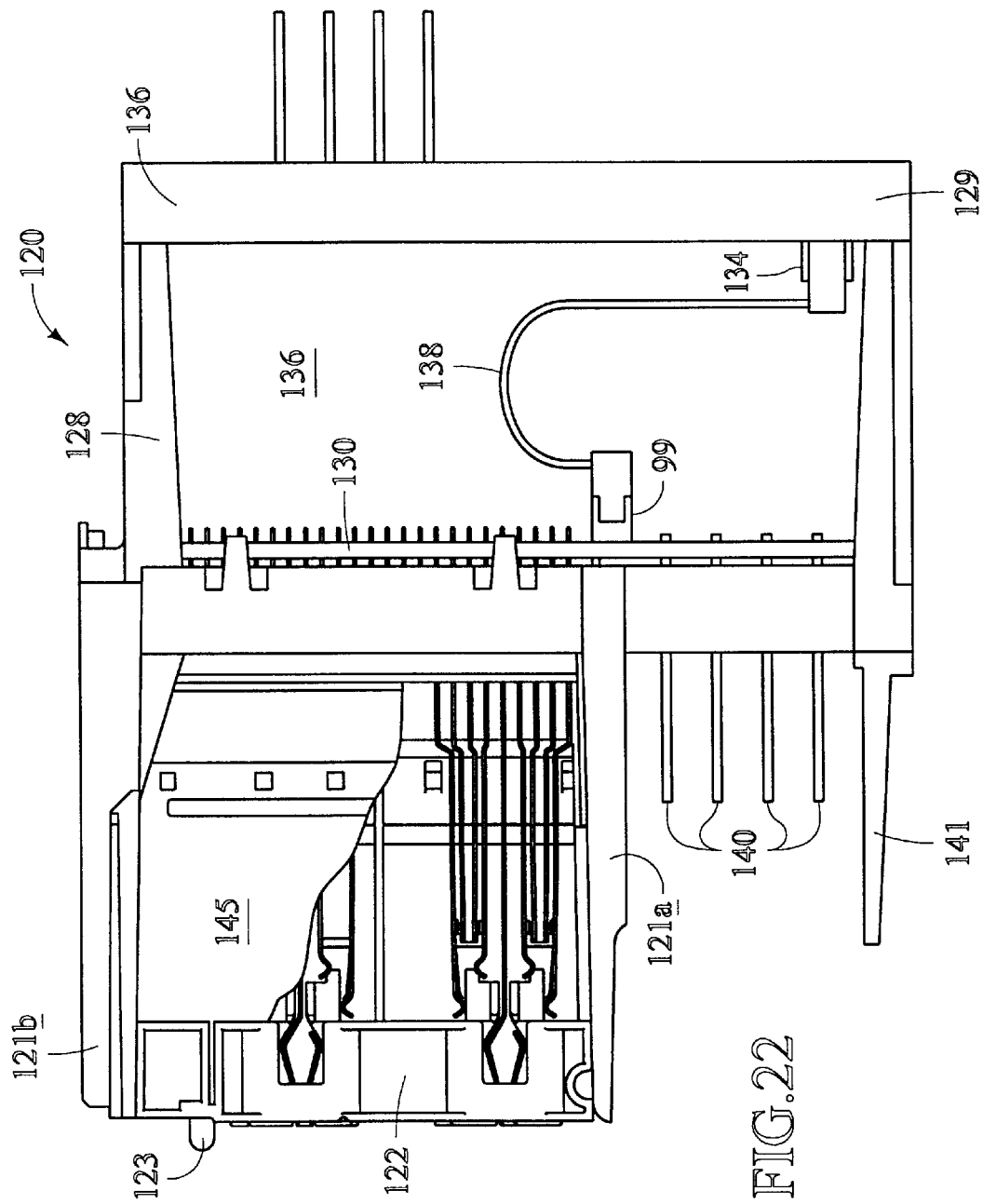
FIG. 22 is a side view of another embodiment of a jack assembly, showing a ribbon cable connector between a first and a second circuit board.

FIG. 22 is a side view of another embodiment of a jack assembly, showing a ribbon cable 138 between connectors 99 and 134, the ribbon cable 138 providing traditional electrical connection between first circuit board 130 and the second circuit board (not seen in this figure). FIG. 22 further illustrates a different distance between the respective circuit boards. All other like components are numbered the same as in FIG. 2 and will not be repeated here.

Figure 23:
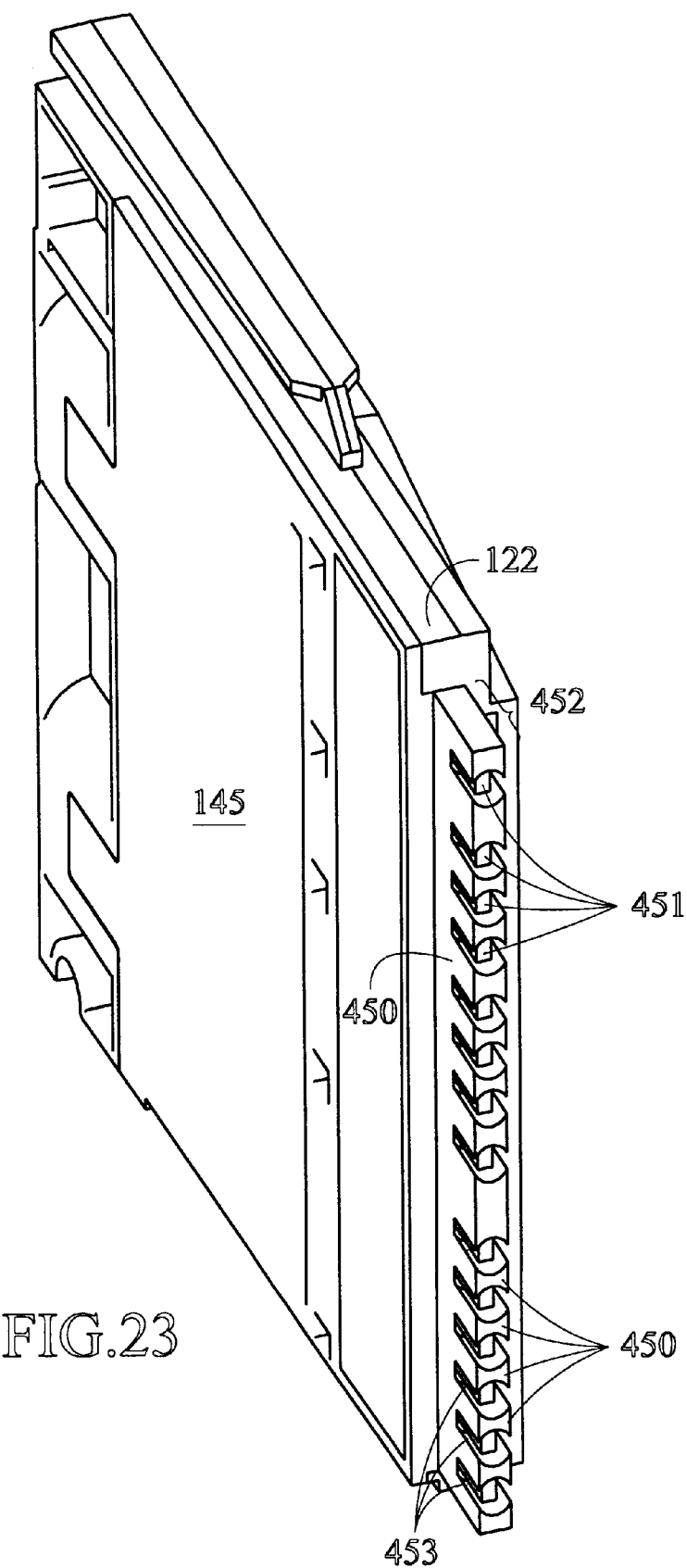
FIG. 23 is a rear perspective view of another embodiment of a jack and jack connection system as contemplated by this invention, showing a jack with the male counterpart of the connection system.

FIG. 23 is a rear perspective view of another embodiment of a jack and jack connection system as contemplated by this invention, showing a jack with the male counterpart of the connection system. FIG. 23 better illustrates the male counterpart connector to the female connector shown at the rear end of FIG. 18. FIG. 23 illustrates pin connectors 451 within protective and guiding shroud 450 on jack 122 with cover 145. The male pin connector shown on the rear of the jack 122 may also be used on a circuit board as attaching termination pins and other similar shaped conductors to circuit boards is known. The shroud 450 is preferably made of dielectric material and protects the terminal pins 451 from being bent or improperly inserted in prior art female pin receivers or receptacles.

The slits 453 in shroud 450 correspond in size and depth to tuning fork connectors contained in a corresponding female connector, such as a female connector as shown in FIG. 18 and tuning fork connection ends of contacts, such as shown in FIG. 15. When the male connector slides in the female connection end, it is preferred that the relative sliding be at a slight angle to apply contact pressure between the tuning fork and the terminal pin. It should also be noted that this invention further contemplates that only one of the two prongs of the tuning fork could be utilized.

Figure 24:
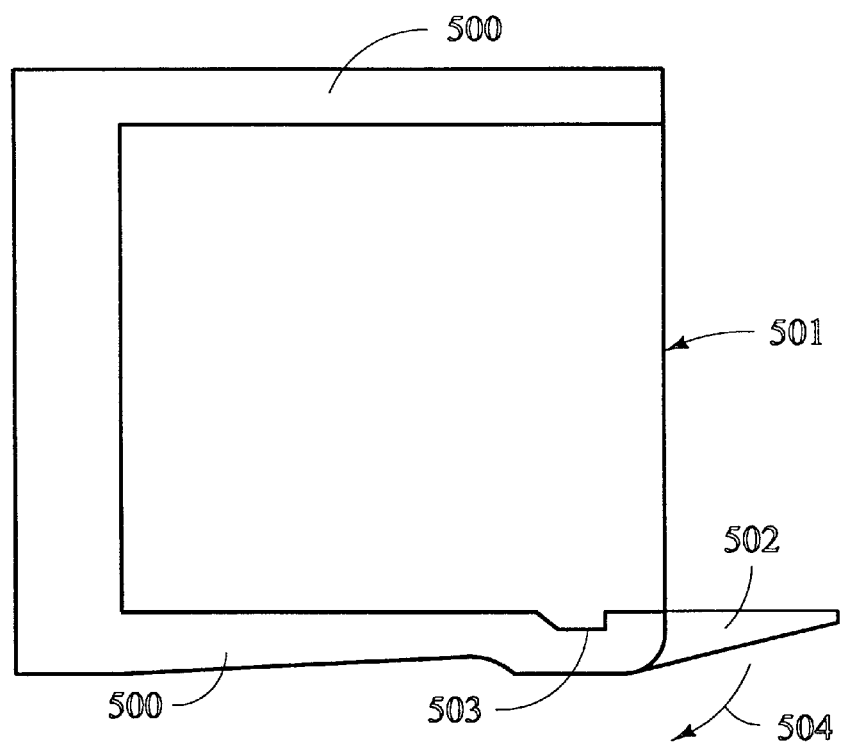
FIG. 24 is a side view of another embodiment of this invention wherein the jack removal tool is pivotally mounted to the mount support structure.

FIG. 24 is a side view of another embodiment of this invention wherein the jack removal tool 502 is pivotally mounted to the mount support structure 500. FIG. 24 also shows jack 501 and jack stop 503.

Figure 25:
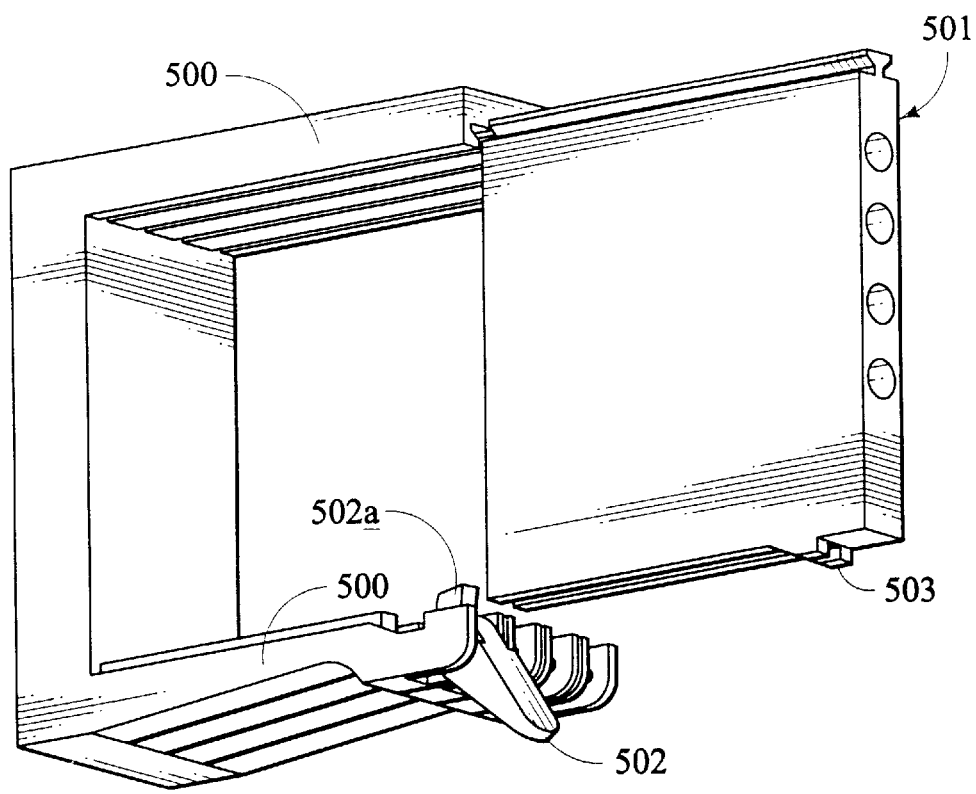
FIG. 25 is a perspective view of the embodiment of this invention shown in FIG. 24, after the jack has been released.

FIG. 25 is a perspective view of the embodiment of this invention shown in FIG. 24, after the jack 500 has been released. FIG. 25 illustrates the jack 501 with jack stop 503, and how the pivotal movement of jack removal tool 502 forces the jack end 502 of the jack removal tool 502 into jack 501. The lower arm of jack mount support 500 is thereby deflected downward to allow jack stop 503 the clearance to be removed from the jack mount support. FIG. 25 further illustrates how jack removal tool utilizes a pivot axis attached to the jack mount support structure 500 as a fulcrum to remove the jack 500.

As will be appreciated by those of reasonable skill in the art, there are numerous embodiments to this invention, and variations of elements and components which may be used, all within the scope of this invention.

One embodiment of this invention for example is connection system for electrically connecting a DSX jack to a jack assembly, the rear connection system comprising: a male connector comprised of: a plurality of elongated conductors electrically connected to one of the jack and the jack assembly; a dielectric shroud around the elongated conductors, the shroud having slits adjacent each of the elongated conductors; a female connector comprised of: a female dielectric edge connector with an internal cavity with guides therein; a plurality of tuning fork contacts seated within the guides in the internal cavity and electrically connected to the other of the jack and the jack assembly, the tuning fork contacts including two prongs with a conductor aperture between the two prongs, the conductor aperture corresponding to the elongated conductors of the male connector, and the tuning fork contacts positioned to slidably mate with corresponding ones of the plurality of elongated conductors in the male connector; and such that the male connector slides into the female connector and electrical contact is thereby made between the tuning fork contacts and the corresponding ones of the plurality of elongated conductors in the male connector.

Further embodiments of the foregoing may be: wherein the elongated conductors are terminal pins; and/or wherein only one of the two prongs comprising the connection end of the plurality of tuning fork contacts are included.

In another embodiment of the invention, a DSX jack may be comprised of: a jack body with a front end and a rear end, the jack body being formed of a dielectric material, the jack body defining a plurality of plug apertures sized to receive plugs having tip and ring contacts; the jack including a plurality of electrically conductive tip and ring springs with rearward connection ends, the tip springs being adapted to make electrical contact with the tip contacts of the plugs when the plugs are inserted within the plug apertures, and the ring springs being adapted to make electrical contact with the ring contacts of the plugs when the plugs are inserted within the plug apertures; the jack including a plurality of normal contacts adapted to normally make electrical contact with the tip and ring springs, the plurality of normal contacts including rearward connection ends; and a plurality of cross-connect contacts with rearward connection ends; wherein the connection ends of the plurality of cross-connect contacts, the connection ends of plurality of normal contacts and the connection ends of the plurality of electrically conductive tip and ring springs, comprise tuning fork contacts.

Further embodiments of the foregoing may be wherein the plurality of tuning fork contacts are within a female connector which is comprised of: a female dielectric edge connector with an internal cavity with a plurality guides therein; wherein the tuning fork contacts including two prongs with a conductor aperture between the two prongs, the conductor aperture disposed to receive corresponding elongated male.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A connection system for electrically connecting a DSX jack to a jack assembly, the connection system comprising:
   a male connector comprised of:
      a plurality of elongated conductors electrically connected to one of the jack and the jack assembly;
      a dielectric shroud around the elongated conductors, the shroud having slits adjacent each of the elongated conductors;
   a female connector comprised of:
      a female dielectric edge connector with an internal cavity with guides therein;
      a plurality of tuning fork contacts seated within the guides in the internal cavity and electrically connected to the other of the jack and the jack assembly, the tuning fork contacts including two prongs with a conductor aperture between the two prongs, the conductor aperture corresponding to the elongated conductors of the male connector, and the tuning fork contacts positioned to slidably mate with corresponding ones of the plurality of elongated conductors in the male connector; and
      such that the male connector slides into the female connector and electrical contact is thereby made between the tuning fork contacts and the corresponding ones of the plurality of elongated conductors in the male connector.

2. A connection system as recited in claim 1, and further wherein the elongated conductors are terminal pins.

3. A DSX jack comprised of:

a jack body with a front end and a rear end, the jack body being formed of a dielectric material, the jack body defining a plurality of plug apertures sized to receive plugs having tip and ring contacts;

the jack including a plurality of electrically conductive tip and ring springs with rearward connection ends, the tip springs being adapted to make electrical contact with the tip contacts of the plugs when the plugs are inserted within the plug apertures, and the ring springs being adapted to make electrical contact with the ring contacts of the plugs when the plugs are inserted within the plug apertures;

the jack including a plurality of normal contacts adapted to normally make electrical contact with the tip and ring springs, the plurality of normal contacts including rearward connection ends; and a plurality of spring contacts with rearward connection ends;

wherein the connection ends of the plurality of spring contacts, the connection ends of plurality of normal contacts and the connection ends of the plurality of electrically conductive tip and ring springs, comprise tuning fork contacts.

4. A DSX jack as recited in claim 3, and further wherein the plurality of tuning fork contacts are within a female connector which is comprised of:

a female dielectric edge connector with an internal cavity with a plurality guides therein;

wherein the tuning fork contacts including two prongs with a conductor aperture between the two prongs, the conductor aperture disposed to receive corresponding elongated male.

* * * * *